United States Patent
Chang et al.

(10) Patent No.: US 10,444,889 B2
(45) Date of Patent: Oct. 15, 2019

(54) TOUCH DISPLAY DEVICE AND ITS DRIVING METHOD

(71) Applicant: LG Display Co., Ltd., Seoul (KR)

(72) Inventors: SeHyun Chang, Pohang-si (KR); Dong-Woo Lee, Chungcheongnam-do (KR)

(73) Assignee: LG Display Co., Ltd., Seoul (KR)

( * ) Notice: Subject to any disclaimer, the term of this patent is extended or adjusted under 35 U.S.C. 154(b) by 51 days.

(21) Appl. No.: 15/838,822

(22) Filed: Dec. 12, 2017

(65) Prior Publication Data
US 2018/0181248 A1    Jun. 28, 2018

(30) Foreign Application Priority Data
Dec. 28, 2016    (JP) .......................... 10-2016-0180588

(51) Int. Cl.
*G06F 3/041*    (2006.01)
*G06F 3/044*    (2006.01)

(52) U.S. Cl.
CPC ............ *G06F 3/0414* (2013.01); *G06F 3/044* (2013.01); *G06F 3/0412* (2013.01); *G06F 3/0416* (2013.01); *G06F 3/0418* (2013.01); *G06F 2203/04112* (2013.01); *G09G 2310/0264* (2013.01)

(58) Field of Classification Search
CPC ........ G06F 3/044; G06F 3/041; G06F 3/0414; H03K 17/962; H03K 17/955; H03K 17/9645; G01D 5/24
See application file for complete search history.

(56) References Cited

U.S. PATENT DOCUMENTS

| | | | |
|---|---|---|---|
| 9,304,575 B2 | 4/2016 | Lee et al. | |
| 9,696,883 B2 | 7/2017 | Oh et al. | |
| 10,310,682 B2* | 6/2019 | Lu | G06F 3/044 |
| 10,318,054 B2* | 6/2019 | Suzuki | G06F 3/0416 |
| 10,324,556 B2* | 6/2019 | Weng | G06F 3/0412 |
| 2010/0024573 A1* | 2/2010 | Daverman | G01L 1/142 |
| | | | 73/862.626 |
| 2010/0108409 A1* | 5/2010 | Tanaka | G06F 3/044 |
| | | | 178/18.06 |
| 2011/0069036 A1* | 3/2011 | Anno | G06F 3/03545 |
| | | | 345/174 |
| 2012/0019474 A1* | 1/2012 | Hsieh | G06F 3/0418 |
| | | | 345/174 |
| 2012/0182261 A1* | 7/2012 | Wang | G06F 3/044 |
| | | | 345/174 |

(Continued)

FOREIGN PATENT DOCUMENTS

KR    10-2016-0082638 A    7/2016

*Primary Examiner* — William Lu
(74) *Attorney, Agent, or Firm* — Morgan, Lewis & Bockius LLP

(57) ABSTRACT

A touch display device, as well as its driving method, is capable of supplying a touch driving signal for touch sensing and a force touch driving signal for force touch sensing, while also reducing current consumption. A driving circuit of the touch display device changes the number of changing a pulse waveform of a sync signal between a high logic level and a low logic level, wherein the sync signal is provided to control a touch driving signal supplied to a plurality of touch electrodes, and a force touch driving signal supplied to a display module.

7 Claims, 5 Drawing Sheets

(56) References Cited

U.S. PATENT DOCUMENTS

| | | | |
|---|---|---|---|
| 2014/0184956 A1* | 7/2014 | Satou | G06F 3/044 349/12 |
| 2014/0247239 A1* | 9/2014 | Jamshidi-Roudbari | G06F 3/0414 345/174 |
| 2015/0331517 A1* | 11/2015 | Filiz | G06F 3/0414 345/173 |
| 2016/0098131 A1* | 4/2016 | Ogata | G06F 1/1643 345/173 |

* cited by examiner

TOUCH DISPLAY DEVICE AND ITS DRIVING METHOD

CROSS REFERENCE TO RELATED APPLICATIONS

This application claims the benefit of the Korean Patent Application No. 10-2016-0180588 filed on Dec. 28, 2016, which is hereby incorporated by reference as if fully set forth herein.

BACKGROUND

Technical Field

Embodiments of the present disclosure relate to a touch display device and its driving method.

Discussion of the Related Art

A touch display apparatus is a type of input apparatus that allows a user to input information through a screen contact of a display apparatus without an additional input device in electronic devices. A touch screen apparatus is generally used as the input device for various kinds of products such as television, notebook computer and monitor as well as portable electronic devices such as electronic notebook, electronic book (e-book), PMP (Portable Multimedia Player), navigation, UMPC (Ultra Mobile PC), mobile phone, smart phone, smart watch, tablet PC (tablet Personal Computer), watch phone, and mobile communication terminal.

Recently, with an establishment of a user interface environment such as application which requires touch information, a touch display apparatus capable of sensing a force touch have been developed and studied. In case of force touch, a force applied to an upper surface of the touch display apparatus can be sensed by sensing a height difference corresponding to a gap between the upper surface of the touch display apparatus and a rear surface of the touch display apparatus.

A sync signal is an input signal for a touch sensing and a force touch sensing. In case of a related art in-cell touch display apparatus, an entire period is divided into a touch sensing period and a force touch sensing period, and the sync signal is supplied for the entire period. This is because a touch driving signal is supplied for the touch sensing period, and a force touch driving signal is supplied for the force touch sensing period.

The touch driving signal and the force touch driving signal have a pulse waveform in which a high logic level and a low logic level are alternately repeated. If the touch driving signal and the force touch driving signal are supplied continuously, a voltage change occurs continuously, which causes the increase of current consumption.

SUMMARY

Accordingly, embodiments of the present disclosure are directed to a touch display device that substantially obviates one or more problems due to limitations and disadvantages of the related art, and its driving method.

An aspect of the present disclosure is to provide a touch display device which is capable of supplying a touch driving signal for a touch sensing, and a force touch driving signal for a force touch sensing, and also reducing a current consumption, and its driving method.

Additional advantages and features of embodiments of the disclosure will be set forth in part in the description which follows and in part will become apparent to those having ordinary skill in the art upon examination of the following or may be learned from practice of embodiments of the disclosure. The objectives and other advantages of embodiments of the disclosure may be realized and attained by the structure particularly pointed out in the written description and claims hereof as well as the appended drawings.

To achieve these and other advantages and in accordance with the purpose of embodiments of the disclosure, as embodied and broadly described herein, a touch display device comprises a display module having a plurality of touch electrodes; a cover window for covering a front surface of the display module; a housing having a housing plate and a housing sidewall, wherein the housing plate with electrical conductivity is arranged below a rear surface of the display module, and the housing sidewall surrounds at least one portion of a lateral surface of the display module or supports the display module; and a driving circuit for sensing a change of capacitance between the plurality of touch electrodes and the housing plate in accordance with a distance change between the plurality of touch electrodes and the housing plate, wherein the driving circuit changes the number of changing a pulse waveform of a sync signal between a high logic level and a low logic level, wherein the sync signal is provided to control a touch driving signal supplied to the plurality of touch electrodes, and a force touch driving signal supplied to the display module.

In another aspect, a method for driving a touch display device comprises sensing the change of capacitance between a plurality of touch electrodes and a housing plate in accordance with the change of distance between the plurality of touch electrodes and the housing plate by the use of driving circuit; and changing the number of changing a pulse waveform of a sync signal between a high logic level and a low logic level, wherein the sync signal is provided to control a touch driving signal supplied to the plurality of touch electrodes, and a force touch driving signal, by the use of driving circuit.

It is to be understood that both the foregoing general description and the following detailed description of embodiments of the present disclosure are exemplary and explanatory and are intended to provide further explanation of the disclosure as claimed.

BRIEF DESCRIPTION OF THE DRAWINGS

The accompanying drawings, which are included to provide a further understanding of the disclosure and are incorporated in and constitute a part of this application, illustrate embodiments of the disclosure and together with the description serve to explain the principles of the disclosure. In the drawings.

DETAILED DESCRIPTION

Figure 1:
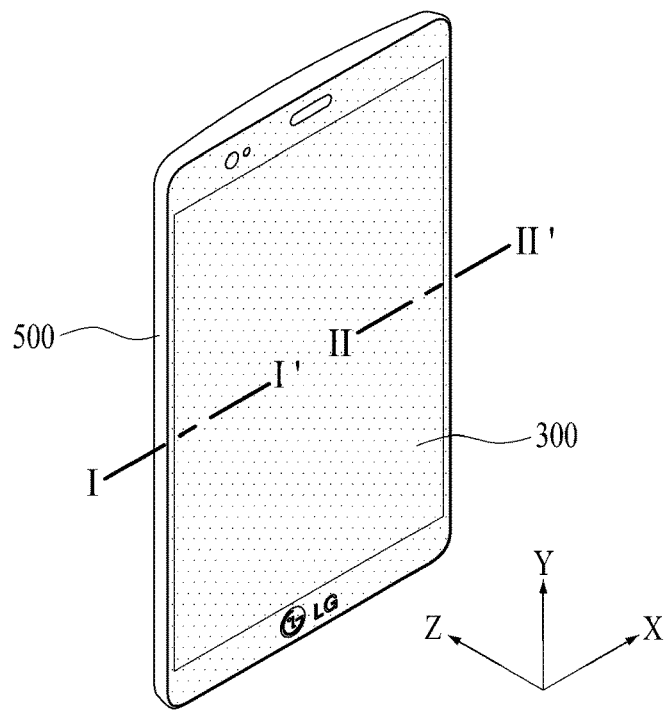
FIG. 1 is a perspective view illustrating a touch display device according to one embodiment of the present disclosure.

Reference will now be made in detail to the exemplary embodiments of the present disclosure, examples of which are illustrated in the accompanying drawings. Wherever possible, the same reference numbers will be used throughout the drawings to refer to the same or like parts. Advantages and features of the present disclosure, and implementation methods thereof will be clarified through following embodiments described with reference to the accompanying drawings. The present disclosure may, however, be embodied in different forms and should not be construed as limited to the embodiments set forth herein. Rather, these embodiments are provided so that this disclosure will be thorough and complete, and will fully convey the scope of the present disclosure to those skilled in the art. Further, the present disclosure is only defined by scopes of claims.

A shape, a size, a ratio, an angle, and a number disclosed in the drawings for describing embodiments of the present disclosure are merely an example, and thus, the present disclosure is not limited to the illustrated details. Like reference numerals refer to like elements throughout. In the following description, when the detailed description of the relevant known function or configuration is determined to unnecessarily obscure the important point of the present disclosure, the detailed description will be omitted.

In a case where 'comprise', 'have', and 'include' described in the present specification are used, another part may be added unless 'only~' is used. The terms of a singular form may include plural forms unless referred to the contrary.

In construing an element, the element is construed as including an error region although there is no explicit description.

In describing a position relationship, for example, when the positional order is described as 'on~', 'above~', 'below~', and 'next~', a case which is not contact may be included unless 'just' or 'direct' is used.

In describing a time relationship, for example, when the temporal order is described as 'after~', 'subsequent~', 'next~', and 'before~', a case which is not continuous may be included unless 'just' or 'direct' is used.

It will be understood that, although the terms "first", "second", etc. may be used herein to describe various elements, these elements should not be limited by these terms. These terms are only used to distinguish one element from another. For example, a first element could be termed a second element, and, similarly, a second element could be termed a first element, without departing from the scope of the present disclosure.

Also, "X-axis direction", "Y-axis direction", and "Z-axis direction" are not limited to a perpendicular geometric configuration. That is, "X-axis direction", "Y-axis direction", and "Z-axis direction may include an applicable wide range of a functional configuration.

Also, it should be understood that the term "at least one" includes all combinations related with any one item. For example, "at least one among a first element, a second element and a third element" may include all combinations of two or more elements selected from the first, second and third elements as well as each element of the first, second and third elements. Also, if it is mentioned that a first element is positioned "on or above" a second element, it should be understood that the first and second elements may be brought into contact with each other, or a third element may be interposed between the first and second elements.

Features of various embodiments of the present disclosure may be partially or overall coupled to or combined with each other, and may be variously inter-operated with each other and driven technically as those skilled in the art can sufficiently understand. The embodiments of the present disclosure may be carried out independently from each other, or may be carried out together in co-dependent relationship.

Hereinafter, a touch display device according to the embodiment of the present disclosure and a method for driving the same will be described with reference to the accompanying drawings.

Figure 2:
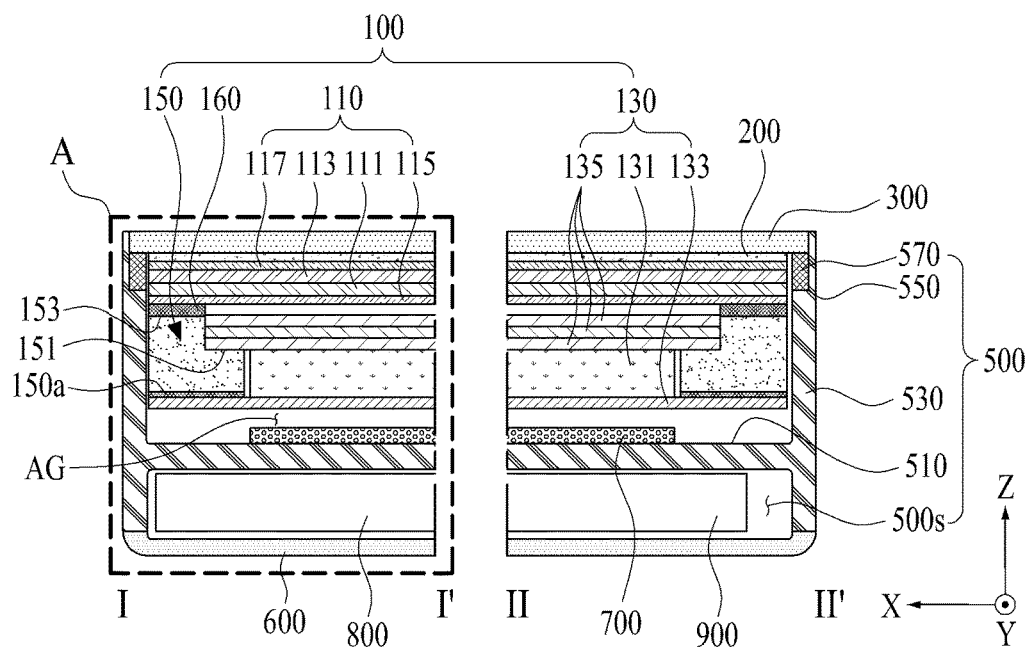
FIG. 2 is a cross sectional view along I-I' and II-IP of FIG. 1.
Figure 3:
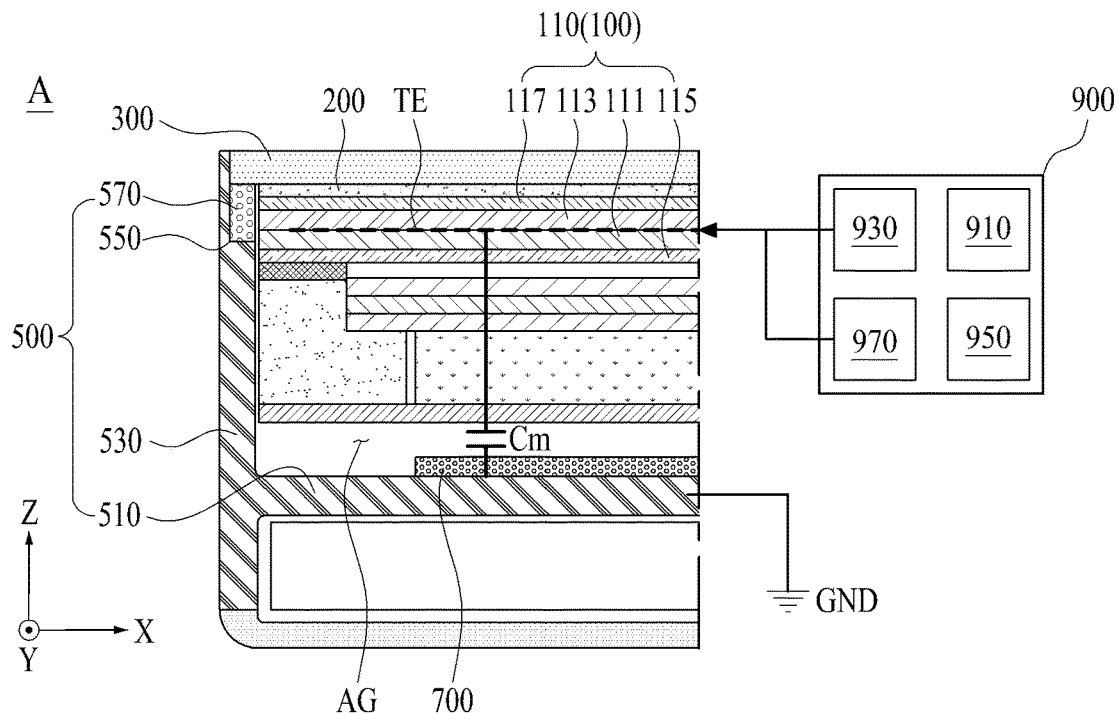
FIG. 3 is an expanded view showing 'A' portion of FIG. 2.
Figure 4:
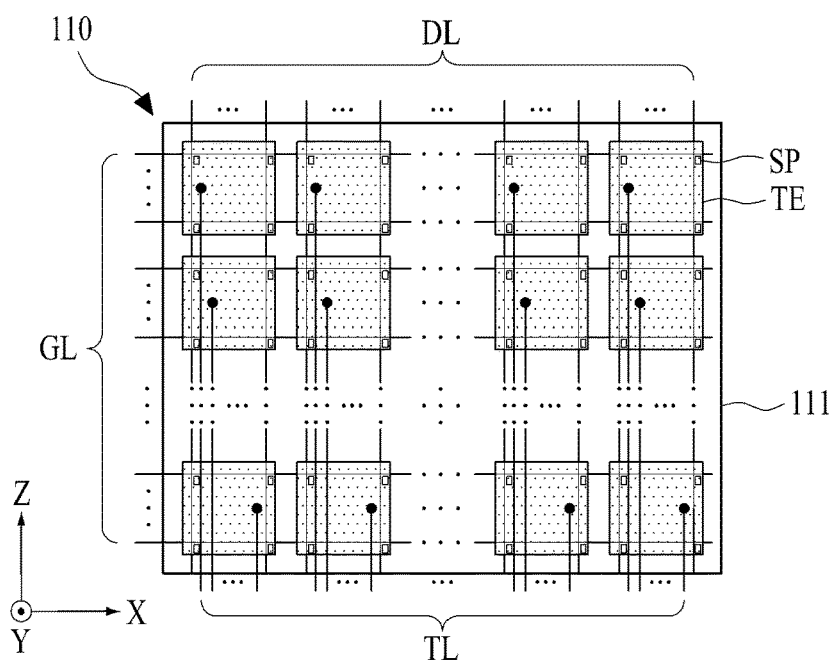
FIG. 4 illustrates a display panel shown in FIG. 2.

FIG. 1 is a perspective view illustrating a touch display device according to one embodiment of the present disclosure. FIG. 2 is a cross sectional view along I-I' and II-II' of FIG. 1. FIG. 3 is an expanded view showing 'A' portion of FIG. 2. FIG. 4 illustrates a display panel shown in FIG. 2.

Referring to FIGS. 1 to 4, the touch display device according to one embodiment of the present disclosure may include a display module 100, a cover window 300, a housing 500, an impact-absorbing member 700, and a driving circuit 900.

The display module 100 may be driven in a display mode or a touch sensing mode under control of the driving circuit 900. For the display mode, an image corresponding to a video signal supplied from the driving circuit 900 is displayed on the display module 100. For the touch sensing mode, the display module 100 sense at least one of a touch position and a touch force of a user's touch by the driving circuit 900. The display module 100 includes a touch sensor for sensing at least one of the touch position and the touch force of the user's touch. The display module 100 may include a display panel 110, a backlight unit 130, and a guide frame 150.

The display panel 110 is a liquid crystal display panel on which an image is displayed by driving liquid crystal molecules, wherein the liquid crystal display panel includes confronting lower and upper substrates 111 and 113 bonded to each other with a liquid crystal layer interposed therebetween. The display panel 110 displays a predetermined image by the use of light emitted from the backlight unit 130.

The lower substrate 111 is a thin film transistor array substrate, wherein the lower substrate 111 includes a plurality of sub pixels (SP) prepared every pixel region defined by a plurality of gate and data lines (GL, DL) crossing each other. Each sub pixel (SP) may include a thin film transistor connected with the gate and data lines, a pixel electrode connected with the thin film transistor, and a common electrode provided adjacent to the pixel electrode and supplied with a common voltage.

A pad portion, which is connected with each signal line, is prepared at a lower edge of the lower substrate 111, and the pad portion is connected with the driving circuit 900. An internal gate driving circuit for driving the gate line (GL) of the display panel 110 may be prepared at the left side of the lower substrate 111, the right side of the lower substrate 111, or both left and right sides of the lower substrate 111. The internal gate driving circuit may be manufactured together with the thin film transistor while being connected with each gate line (GL). The internal gate driving circuit generates a gate signal which is sequentially shifted in accordance with a gate control signal supplied from the driving circuit 90, and supplies the gate signal to the corresponding gate line (GL).

The upper substrate 113 includes a pixel defining pattern for defining an opening area overlapped with each pixel region of the lower substrate 111, and a color filter formed in the opening area. The lower and upper substrates 111 and 113 confronting each other are bonded to each other by the use of sealant so that the remaining area of the lower substrate 111 except the pad portion is covered by the upper substrate 113.

An alignment film for setting a pretilt angle of liquid crystal is formed in at least one of the lower substrate 111 and the upper substrate 113. The liquid crystal layer is interposed between the lower and upper substrates 111 and 113. Herein, the liquid crystal layer is formed of liquid crystal with the liquid crystal molecules which are aligned in accordance with an electric field of In-Plane Switching mode by data and common voltages applied to the pixel electrode.

A lower polarizing member 115 having a first polarizing axis is attached to a rear surface of the lower substrate 111, and an upper polarizing member 117 having a second polarizing axis is attached to a front surface of the upper substrate 113, wherein the first polarizing axis intersects with the second polarizing axis.

In the display panel 110, the touch sensor corresponds to a touch electrode (TE) used as a common electrode for the touch sensing mode, and the common electrode together with the pixel electrode is used as a liquid crystal driving electrode for the display mode according as the common voltage is supplied to the common electrode. That is, the display panel 110 may be an in-cell touch type liquid crystal display panel, and more particularly, in-cell self-capacitance touch type liquid crystal display panel.

The touch electrode (TE) is patterned by each unit of the adjacent sub pixels (SP). The touch electrode (TE) is overlapped with at least one gate line (GL) and at least one data line (DL). The pixel electrode and the touch electrode (TE) are formed of a transparent conductive material such as Indium-Tin-Oxide (ITO). The touch electrode (TE) is connected with the driving circuit 900 through a touch routing line (TL).

A size of one touch electrode (TE) may correspond to a total size of the several sub pixels (SP). For example, one touch electrode (TE) may have a size corresponding to the 40 pixels in a horizontal direction parallel to a length direction of the gate line (GL), and the 12 pixels in a vertical direction parallel to a length direction of the data line (DL). In this case, a size of one touch electrode (TE) may be the same as a total size of the 480 pixels, but not limited to this structure. A size of the touch electrode (TE) may be changed in accordance with a size (or resolution) of the display panel 110 and a touch resolution of the display panel 110. In the display panel 110, the plurality of touch electrodes (TE) are arranged in a lattice configuration, wherein the plurality of touch electrodes (TE) are not identical in size. For example, a size in each of the second touch electrodes arranged in the edge of the display panel 110 may be smaller than a size in each of the first touch electrodes arranged in the center of the display panel 110. In this case, it is possible to realize uniformity of touch sensitivity between the center of the display panel 110 and the edge of the display panel 110.

The backlight unit 130 is disposed below the display panel 110, wherein the backlight unit 130 emits light to the display panel 110. The backlight unit 130 may include a light guiding plate 131, a light source, a reflective sheet 133, and an optical sheet portion 135.

The light guiding plate 131 includes a light-incidence portion prepared at least one lateral surface. The light guiding plate 131 guides light which is incident on the light-incidence portion toward an upper direction, that is, a direction of the display panel 110.

The light source is provided in such a way that the light source confronts the light-incidence portion of the light guiding plate 131, whereby the light source provides light to the light-incidence portion of the light guiding plate 131. The light source may include a printed circuit board disposed adjacent to the light-incidence portion of the light guiding plate 131, and a plurality of light emission diode packages provided on the printed circuit board.

The reflective sheet 133 is disposed inside the housing 500, and the reflective sheet 133 covers a rear surface of the light guiding plate 131. The reflective sheet 133 reflects light which is incident through a lower surface of the light guiding plate 131 toward the inside of the light guiding plate 131, to thereby minimize a loss of light.

The optical sheet portion 135 is disposed on the light guiding plate 131, and the optical sheet portion 135 is provided to improve luminance properties of the light guided by the light guiding plate 131. For example, the optical sheet portion 135 may include a diffusion sheet, a prism sheet, and a dual brightness enhancement film, but not limited to this structure. For example, the optical sheet portion 135 may be formed in a deposition structure including at least two selected among a diffusion sheet, a prism sheet, a dual brightness enhancement film, and a lenticular sheet.

Additionally, the display module 100 may further include a viewing angle control film disposed between the display panel 110 and the optical sheet portion 135. The viewing angle control film is overlapped with the plurality of sub pixels (SP), and is provided to restrict a light emission angle in each of the plurality of sub pixels (SP), whereby a viewing angle of the display panel 110 is limited to a preset range.

The guide frame 150 is formed in a rectangular band shape, and is attached to a rear edge portion of the display panel 110. The guide frame 150 surrounds each lateral surface of the backlight unit 130 so that it is possible to minimize a movement of the backlight unit 130. The guide frame 150 includes a sheet supporter 151 and a panel supporter 153.

The sheet supporter 151 is formed in a rectangular band shape while being overlapped with the backlight unit 130, that is, the edge of the optical sheet portion 135, to thereby support the edge of the optical sheet portion 135. A lower surface of the sheet supporter 151 may be attached to an expanded area of the reflective sheet 133 by the use of adhesion member 150*a*.

Additionally, the sheet supporter 151 may further include a supporter for the light guiding plate 131, which is protruding from an inner surface of the sheet supporter 151 while being overlapped with the light guiding plate 131. The supporter for the light guiding plate 131 may support an edge of a lower surface of the light guiding plate 131.

The panel supporter 153 which protrudes from an edge of an upper surface of the sheet supporter 151 is formed in a rectangular band shape, and is attached to an edge of a rear surface of the display panel 110 through the use of panel adhesion member 160. The panel adhesion member 160 may include double-sided tape, thermo-curing resin, photo-curing resin, or double-sided adhesive foam pad.

The guide frame 150 is attached to the display panel 110, to thereby support the backlight unit 130. Through the use of guide frame 150, the backlight unit 130 is suspended on the rear surface of the display panel 110.

The cover window 300 is attached to an entire surface of the display panel 110, and is supported on the housing 500. The cover window 300 supported on the housing 500 may be deformed to be recessed into the housing 500 in accordance with a user's touch pressure.

The cover window 300 is attached to the display panel 110, and more particularly, an entire surface of the upper polarizing member 117 by the use of transparent adhesion member 200 so that it is possible to support the display panel 110 and to protect the display panel 110 from an external shock. The transparent adhesion member 200 may include optical clear adhesive (OCA) or optical clear resin (OCR).

The cover window 300 may be formed of tempered glass, transparent plastic, or transparent film. For example, the cover window 300 may include at least one of sapphire glass and gorilla glass. According to another example, the cover window 300 may include any one among PET (polyethyleneterephthalate), PC (polycarbonate), PES (polyethersulfone), PEN (polyethylenenapnthalate), and PNB (polynorbornene). Preferably, the cover window 300 is formed of tempered glass in consideration of scratch and transparency.

The housing 500 receives the display module 100 therein, and also supports the cover window 300. The housing 500 directly covers a rear surface and each lateral surface of the display module 100 attached to the cover window 300.

The housing 500 has a receiving space defined by a housing plate 510 and a housing sidewall 530, wherein the housing 500 may include a case shape whose upper surface is opened. The housing 500 may include a conductive material or a metal material. For example, the housing 500 may include an aluminum (Al) material, an invar material, or a magnesium (Mg) material. The housing 500 is electrically connected with a power supply circuit, wherein the housing 500 may be supplied with AC voltage or DC voltage with a constant voltage level from the power supply circuit, or may be electrically grounded (GND). Hereinafter, it is assumed that the housing 500 is electrically grounded.

The housing plate 510 serves as a bottom surface of the receiving space, and the housing plate 510 covers a rear surface of the backlight unit 130.

At least one system receiving space 500s may be prepared in a rear surface of the housing plate 510. A battery 800 for supplying a driving power, a communication module, a power supply circuit, a memory, and a driving circuit 900 of an electronic device may be received in the system receiving space 500s. The system receiving space 500s is covered by a rear cover 600. For replacement of the battery 800, the rear cover 600 may be openably connected with a rear surface of the housing 500, but not limited to this structure. If using an internal type battery in the touch display device, the rear cover 600 is connected with the rear surface of the housing 500 without being opened by a user.

The housing sidewall 530 is vertical to each lateral surface of the housing plate 510. The housing sidewall 530 supports the cover window 300, whereby the housing sidewall 530 directly covers each lateral surface of the display module 100 suspended on the cover window 300. An upper portion of the housing sidewall 530 directly covers each lateral surface of the cover window 300.

A height of the housing sidewall 530 is greater than a total height (or thickness) of the display module 100 so that the display module 100 suspended on the cover window 300 is spaced from the housing plate 510. Accordingly, the touch display device according to one embodiment of the present disclosure includes an air gap (AG) prepared between the housing plate 510 and the display module 100 suspended on a rear surface of the cover window 300.

The air gap (AG) may be defined as a space between the housing plate 510 and the rear surface of the display module 100 spaced from the housing plate 510 by the height of the housing sidewall 530. The air gap (AG) provides a space in which the display module 100 is capable of being moved in an up-and-down direction (Z) by a user's touch pressure, whereby the cover window 300 and the display module 100 may be changed in its shape to a curved line in accordance with a user's touch pressure.

The housing sidewall 530 includes a recess 550 prepared in its upper internal surface. An elastic member 570 may be prepared in the recess 550.

The elastic member 570 is attached to the recess 550, and is disposed between a rear edge of the cover window 300 and a bottom surface of the recess 550, whereby the cover window 300 is capable of being moved in an up-and-down direction (Z) by a user's touch pressure. The elastic member 570 may include a spring, a double-sided adhesive foam pad, or an elastic pad with an elastic restoring force. The cover window 300 is connected with the elastic member 570 disposed in the recess 550 of the housing sidewall 530, to thereby cover the space between the housing sidewall 530 and the display module 100, and an entire surface of the display module 100. As a result, it is possible to protect the display module 100 from an external shock, and to prevent foreign matters from being permeated into the space between the display module 100 and the housing sidewall 530.

Figure 5:
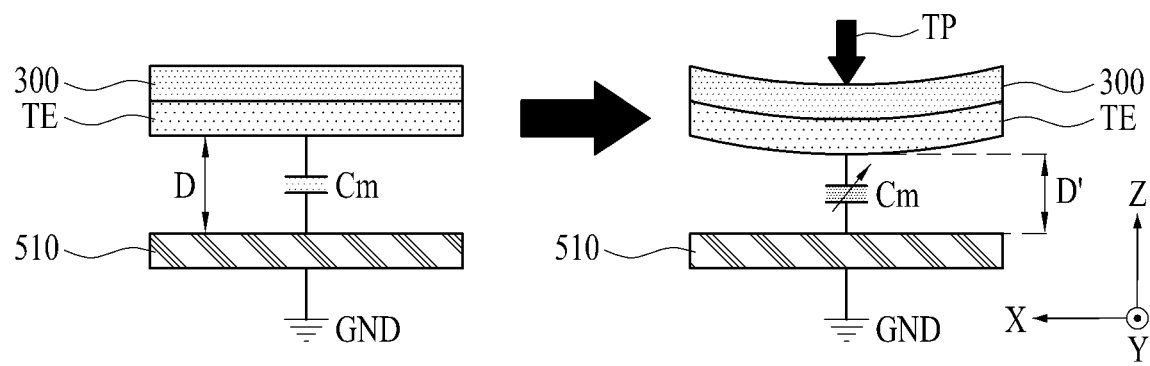
FIG. 5 illustrates the change of capacitance in accordance with a touch pressure on the touch display device according to one embodiment of the present disclosure.

The housing 500 includes a conductive material, whereby a touch sensor for sensing a user's force touch, that is, capacitance (Cm) is formed between the touch electrode (TE) and the housing plate 510. As shown in FIG. 5, the capacitance (Cm) is linearly increased in accordance with the decrease of a distance (D) between the touch electrode (TE) and the housing plate 510. The change of capacitance (Cm) is inversely proportional to the distance change (D'). Thus, according as the display panel 110, which is bent in accordance with a touch pressure (TP) applied to the cover window 300, becomes close to the housing plate 510, the distance (D') between the touch electrode (TE) and the housing plate 510 is reduced so that the change of capacitance (Cm) is increased.

For improving sensitivity of the force touch, under the condition that the touch pressure (TP) is not applied to the cover window 300, the distance between the rear surface of the display module 100 and the housing plate 510 is set to be same as or more than at least 500 μm, preferably. If the distance between the rear surface of the display module 100 and the housing plate 510 is less than 500 μm, the change of capacitance (Cm) in accordance with the touch pressure (TP) is slight. That is, even though the relatively-strong touch pressure (TP) is applied to the touch display device, the change of capacitance (Cm) in accordance with the relatively-strong touch pressure (TP) is slight so that it is difficult to sense the touch pressure (TP), thereby lowering sensitivity of the force touch.

The impact-absorbing member 700 is disposed in the housing plate 510 while being spaced from the rear surface of the display module 100. The impact-absorbing member 700, which is attached to a front surface of the housing plate 510, confronts the rear surface of the display module 100 with the air gap (AG) interposed in-between. The impact-absorbing member 700 prevents the rear surface of the display module 100 from being damaged by a physical contact between the display module 100 and the housing plate 510 on deformation of the display module 100. The impact-absorbing member 700 absorbs an impact applied to the rear surface of the display module 100 from the housing plate 510, to thereby prevent the display module 100 from being damaged by the impact. The impact-absorbing member 700 may include a soft material, for example, polyurethane (PU) material.

The driving circuit 900 is connected with the pad portion prepared in the lower substrate 113. The driving circuit 900 displays the display panel 110 in a time-division driving method of the display mode and the touch sensing mode. For the display mode, the driving circuit 900 displays an image on the display panel 110. For the touch sensing mode, the driving circuit 900 sense a user's touch and/or force touch through the use of touch electrode (TE), and calculates at least one of touch position and touch force level. The driving circuit 900 executes an application corresponding to the calculated touch position and/or touch force level.

For example, the driving circuit 900 may sense the change of self capacitance in the touch electrode (TE) in accordance with a user's touch by the use of finger or conductive object, and may calculate at least one of touch position and touch force level. According to another example, the driving circuit 900 may sense the change of capacitance (Cm) between the touch electrode (TE) and the housing 500 in accordance with a user's touch by the use of finger or conductive object, and may calculate the touch force level, or may additionally calculate the touch position based on the position of the touch electrode (TE) corresponding to the touch force level.

The driving circuit 900 may include a host controller 910, a touch driver 930, a load-free signal generator 950, and a panel driver 970.

The host controller 910 is a micro controller unit (MCU). The display panel 110 may be driven in the display mode or the touch sensing mode by the host controller 910. That is, the host controller 910 generates a mode signal having a first logic state for driving the display panel 110 in the display mode, and a mode signal having a second logic state for driving the display panel 110 in the touch sensing mode. The host controller 910 may generate a mode signal for time-dividing each frame of the display panel 110 into at least one sub frame on the basis of frame synchronization signal (or vertical synchronization signal), and driving the sub frame in the display mode and the touch sensing mode. In case of displaying an image, the image of one frame may be divided into the number of sub frames, and may be displayed in at least one sub frame. For the touch sensing mode of each sub frame, it is possible to realize the touch sensing for at least one touch electrode (TE) based on the number of sub frames, or to realize the touch sensing for all the touch electrodes (TE).

For the display mode, the host controller 910 generates a mode control signal of the first logic state, digital video data, and timing synchronization signal, and supplies the generated mode control signal, digital video data, and timing synchronization signal to the touch driver 930, the load-free signal generator 950, and the panel driver 970.

For the touch sensing mode, the host controller 910 generates a mode control signal of the second logic state, and supplies the generated mode control signal to the touch driver 930, the load-free signal generator 950, and the panel driver 970.

For the touch sensing mode, the host controller 910 calculates at least one of touch position and touch force level based on touch raw data supplied from the touch driver 930. The host controller 910 executes an application corresponding to at least one of the calculated touch position and touch force level. The application may be an application program on the basis of touch position in the touch display device, and an application program on the basis of touch force in the touch display device. The application program on the basis of touch position may be an application program corresponding to a program icon displayed in a touch position. The application program on the basis of touch force may be a security application program for a locking or unlocking function, or an application program corresponding to a force level previously set in a program icon displayed in a touch position.

In detail, for the touch sensing mode, the host controller 910 compares reference raw data with the touch raw data provided from the touch driver 930, and calculates the touch position based on the comparison result, or calculates the touch position and touch force level based on the comparison result.

For example, the capacitance (Cm) formed between the touch electrode (TE) and the housing plate 510 is linearly increased in accordance with the increase of touch pressure so that a value of the touch raw data for a user's force touch is higher than a value for a user's simple touch. With reference to the preset reference raw data, the host controller 910 may calculate the touch position and the touch force level by the use of touch raw data.

For example, with reference to the preset reference raw data, the host controller 910 divides the touch raw data into touch position sensing touch raw data which is less than the reference raw data and force touch sensing touch raw data which is more than the reference raw data. Accordingly, the host controller 910 according to one embodiment of the present disclosure calculates the touch position on the basis of touch raw data which is less than the reference raw data. In this case, it is possible to calculate the touch position (or 2-dimensional touch information) by the position of the touch electrode (TE) having the touch raw data which is less than the reference raw data. Also, the host controller 910 calculates the touch force level and/or touch position on the basis of touch raw data which is more than the reference raw data. In this case, it is possible to calculate the touch force level corresponding to the touch raw data which is more than the touch raw data, or to calculate the touch force level and 3-dimensional touch information including the touch position by the position of the touch electrode (TE) having the touch raw data which is more than the touch raw data.

According to another example, the host controller 910 may calculate the touch position and the touch force level by the use of touch raw data without using the reference raw data. In order to prevent unnecessary power consumption caused by an unnecessary calculation of the touch force level for a user's simple touch, it is necessary to divide a user's touch into a simple touch and a force touch, and calculate a touch force level for the force touch, preferably.

In response to the mode signal of the first logic state supplied from the host controller 910, the touch driver 930 supplies the common voltage (Vcom) to the plurality of touch electrodes (TE) through the plurality of touch routing lines (TL) for the display mode. The touch driver 930 supplies the common voltage (Vcom) to the plurality of touch electrodes (TE) so that each of the plurality of touch electrodes (TE) is used as the common electrode for the display mode in accordance with the mode signal of the first logic state.

In response to the mode signal of the second logic state supplied from the host controller 910, the touch driver 930 supplies a touch driving signal (TDS) to the plurality of touch electrodes (TE) through the plurality of touch routing lines (TL) for the touch sensing mode. After that, the touch driver 930 senses the change of capacitance in accordance with a user's touch for the touch electrode (TE) supplied with the touch driving signal (TDS) through the plurality of touch routing lines (TL), generates the touch raw data based on the change of capacitance, and provides the generated touch raw data to the host controller 910. The touch driver 930 may generate the touch raw data by sensing the change of self capacitance in the touch electrode (TE) through the use of self capacitive sensing circuit.

According as the touch pressure is increased in accordance with the change of capacitance formed between the touch electrode (TE) and the housing plate 510 as well as the change of self capacitance occurring in the touch electrode (TE) in accordance with a user's touch pressure through the use of finger or additional touch object, the touch raw data may have a large data value. According to one example, the touch driver 930 may generate the touch raw data corresponding to the change of self capacitance in the touch electrode (TE) in accordance with a user's touch through the use of finger or additional touch object. According to another example, the touch driver 930 may generate the touch raw data corresponding to the change of capacitance (Cm) formed between the touch electrode (TE) and the housing plate 510 as well as the change of self capacitance occurring in the touch electrode (TE) in accordance with a user's touch by a user's finger or non-conductive object.

In consideration of charge amount, circuit structure, or power consumption, the touch driving signal (TDS) may be selected from any one among an AC driving waveform, a DC driving waveform, and a ground voltage. The AC driving waveform may include a pulse wave, a sine wave, an attenuated sine wave, a square wave, a rectangle wave, a saw-tooth wave, a triangle wave, or a step wave.

The touch driver 930 senses the change of self capacitance in the touch electrode (TE) in accordance with a user's touch. The self capacitive touch sensing method may be obtained by applying the touch driving signal (TDS) to the touch electrode (TE) through the touch routing line (TL), and sensing the change of self capacitance in the touch electrode (TE) supplied with the touch driving signal (TDS) through the touch routing line (TL). According as the touch electrode (TE) is overlapped with gate and data lines (GL, DL), a parasitic capacitance is formed between the touch electrode (TE) and the gate and data lines (GL, DL). The parasitic capacitance becomes a large load on the touch driving process, which might lower preciseness on the touch sensing, or preclude the touch sensing.

For the touch sensing mode, the load-free signal generator 950 generates a load-free signal having the same potential difference and phase as those of the touch driving signal (TDS) in response to the mode signal of the second logic state supplied from the host controller 910, and provides the generated load-free signal to the panel driver 970. The load-free signal generator 950 generates the load-free signal having the same potential difference and phase as those of the touch driving signal (TDS), and supplies the load-free signal to the gate lines (GL1~GLm) and data lines (DL1~DLn) at the same time, to thereby reduce a load of the touch electrode (TE) in accordance with the parasitic capacitance between the touch electrode (TE) and the gate and data lines (GL, DL). If the load-free signal is simultaneously applied to the touch electrode (TE), and the gate and data lines (GL, DL), the potential difference is not generated between the touch electrode (TE) and the gate and data lines (GL1~GLm, DL1~DLn), whereby the parasitic capacitance is not formed between the touch electrode (TE) and the gate and data lines (GL1~GLm, DL1~DLn). As a result, it is possible to improve both touch position sensitivity and force touch sensitivity.

The load-free signal generator 950 generates first and second load-free signals which have the same phase as that of the touch driving signal (TDS), and have a voltage swing width being swung by the same voltage difference, and then provides the first and second load-free signals to the panel driver 970. The first load-free signal may be supplied to the data line (DL) through the panel driver 970, and the second load-free signal may be supplied to the gate line (GL) through the panel driver 970.

The first load-free signal may have a first voltage swing width between a first high voltage and a first low voltage.

The second load-free signal has the same phase as that of the first load-free signal, and has a first voltage swing width between a second high voltage and a second low voltage. The first high voltage is higher than the second high voltage, and the first low voltage is higher than the second low voltage. The second high voltage of the second load-free signal is set to be a voltage level which is lower than a gate high voltage of the gate signal supplied to the gate line (GL) so as to turn on the thin film transistor for the display mode. This is to prevent the thin film transistor from being turned on by the second load-free signal supplied to the gate line (GL) for the touch sensing mode. The second low voltage of the second load-free signal is set to be a voltage level which is lower than the second high voltage by the first voltage swing width. Accordingly, the second load-free signal has the same phase as that of the first load-free signal, and also has the same voltage swing width as that of the first load-free signal.

The panel driver 970 generates the gate signal (GS) for the display mode on the basis of the mode signal of the first logic state, digital video data, and timing synchronization signal supplied from the host controller 910, and supplies the gate signal (GS) to the corresponding gate line (GL1~GLm). Also, the panel driver 970 generates a data signal (Vdata) by a digital-to-analog conversion of digital video data by each sub pixel in synchronization with the supply of the gate signal (GS), and supplies the data signal (Vdata) to the corresponding data line (DL1~DLn). The panel driver 970 drives the liquid crystal by the use of electric field formed by the data signal (Vdata) and the common voltage (Vcom), to thereby display an image on the display panel 110. If the internal gate driving circuit is prepared in the lower substrate 111 of the display panel 110, the panel driver 970 generates the gate control signal on the basis of timing synchronization signal, and provides the gate control signal to the internal gate driving circuit. The internal gate driving circuit generates the gate signal (GS) in accordance with the gate control signal, and supplies the gate signal (GS) to the gate line (GL1~GLm).

The panel driver 970 supplies the load-free signal, which is provided from the load-free signal generator 950, to the display panel 110 on the basis of the mode signal of the second logic state supplied from the host controller 910, to thereby reduce a load of the touch electrode (TE). The panel driver 970 receives the first and second load-free signals from the load-free signal generator 950, supplies the first load-free signal to the data line (DL1~DLn), and supplies the second load-free signal to the gate line (GL1~GLm) in synchronization with the supply of the first load-free signal. If the internal gate driving circuit is prepared in the lower substrate 111 of the display panel 110, the second load-free signal may be supplied to the internal gate driving circuit through the panel driver 970, or may be directly supplied to the internal gate driving circuit from the load-free signal generator 950. The internal gate driving circuit may supply the second load-free signal, which is transmitted from the panel driver 970, or is directly supplied from the load-free signal generator 950, to the gate line (GL1~GLm).

In the driving circuit 900, each of the host controller 910, the touch driver 930, the load-free signal generator 950, and the panel driver 970 may be realized in an individual integrated circuit. The host controller 910, the touch driver 930, and the panel driver 970 may be realized in one integrated circuit. The touch driver 930 and the panel driver 930 may be realized in one integrated circuit. The touch driver 930 may be provided inside the host controller 910. The load-free signal generator 950 may be provided inside any one of the host controller 910, the touch driver 930, and the panel driver 970.

The housing plate 510 of the housing 500 according to one embodiment of the present disclosure is electrically grounded (GND). Thus, if a user's touch (or touch force) is applied thereto, the capacitance (Cm) is formed between the touch electrode (TE) and the housing plate 510. According as the touch pressure is increased, the distance (D) between the touch electrode (TE) and the housing plate 510 is reduced so that the charge amount of the capacitance (Cm) is linearly increased.

Figure 6:
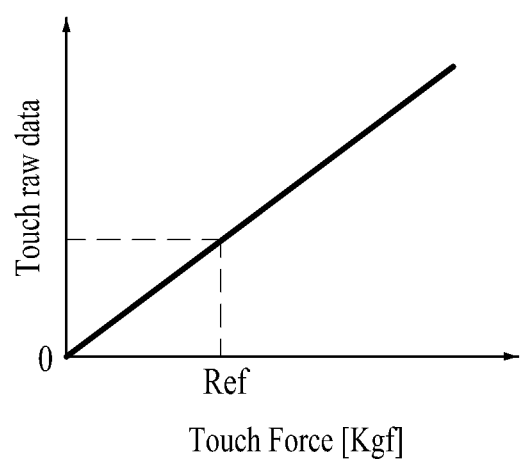
FIG. 6 illustrates the change of touch raw data in accordance with a touch force on the touch display device according to one embodiment of the present disclosure.

As shown in FIG. 6, the value of the touch raw data generated in the touch driver 930 is linearly increased in accordance with the increase of the touch pressure. As shown in FIG. 5, according as the touch pressure is increased, the distance (D') between the touch electrode (TE) and the housing plate 510 is reduced so that the capacitance (Cm) occurring between the touch electrode (TE) and the housing plate 510 is changed largely.

The host controller 910 calculates the touch force level in accordance with the value of the touch raw data on the basis of the touch force level by each touch pressure which is previously set in accordance with each level of the touch pressure.

The touch display device according to one embodiment of the present disclosure includes the display module 100 having the plurality of touch electrodes (TE), the cover window 300 for covering the front surface of the display module 100, the housing 500 having the housing plate 510 with electrical conductivity arranged below the rear surface of the display module 100, and the housing sidewall 530 for surrounding at least one portion of the lateral surface of the display module 100 or supporting the display module 100, and the driving circuit 900 for sensing the change of capacitance between the plurality of touch electrodes (TE) and the housing plate 510 in accordance with the change of distance between the plurality of touch electrodes (TE) and the housing plate 510.

The driving circuit 900 according to one embodiment of the present disclosure changes the number of changing a pulse waveform of a sync signal (Sync) between a high logic level and a low logic level, wherein the sync signal (Sync) is provided to control the touch driving signal (TDS) supplied to the plurality of touch electrodes (TE), and a force touch driving signal (FTDS) supplied to the display module 100.

Figure 7:
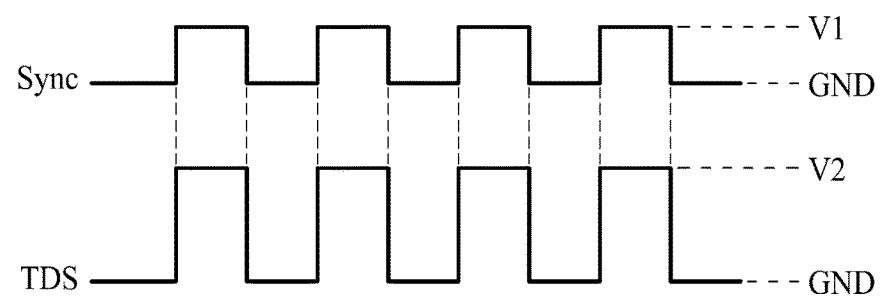
FIG. 7 is a waveform diagram illustrating a sync signal and a touch driving signal according to one embodiment of the present disclosure.

FIG. 7 is a waveform diagram illustrating the sync signal (Sync) and touch driving signal (TDS) according to one embodiment of the present disclosure.

If the sync signal (Sync) has the ground voltage (GND), the touch driving signal (TDS) has the ground voltage (GND). If the sync signal (Sync) has a first voltage (V1), the touch driving signal has a second voltage (V2). A level of the second voltage (V2) is higher than a level of the first voltage (V1). The sync signal (Sync) and the touch driving signal (TDS) have the same waveform and cycle, whereby the sync signal (Sync) and the touch driving signal (TDS) have the same frequency. FIG. 7 shows only the relationship between the sync signal (Sync) and the touch driving signal (TDS). The relationship between the sync signal (Sync) and the force touch driving signal (FTDS) is identical to the relationship between the sync signal (Sync) and the touch driving signal (TDS).

The generated touch driving signal (TDS) and force touch driving signal (FTDS) have the same waveform as that of the sync signal (Sync). Thus, if changing the frequency of the sync signal (Sync), the touch driving signal (TDS) and the force touch driving signal (FTDS) are changed in their frequencies. Accordingly, it is possible to control the number of changing the pulse waveform of the touch driving signal (TDS) and the force touch driving signal (FTDS) to the high logic level and the low logic level for a preset time period.

If there is the large number of changing the pulse waveform of the touch driving signal (TDS) and the force touch driving signal (FTDS) to the high logic level and the low logic level, a touch sensing speed is improved, however, a power consumption is increased. Meanwhile, if there is the small number of changing the pulse waveform of the touch driving signal (TDS) and the force touch driving signal (FTDS) to the high logic level and the low logic level, a power consumption is decreased, however, a touch sensing speed is lowered.

According to the embodiment of the present disclosure, it is possible to change the frequency of the touch driving signal (TDS) and the force touch driving signal (FTDS) by changing the frequency of the sync signal (Sync). Accordingly, it is possible to generate and supply the touch driving signal (TDS) and the force touch driving signal (FTDS) by increasing or decreasing the number of changing the pulse waveform of the touch driving signal (TDS) and the force touch driving signal (FTDS) to the high logic level and the low logic level.

Figure 8:
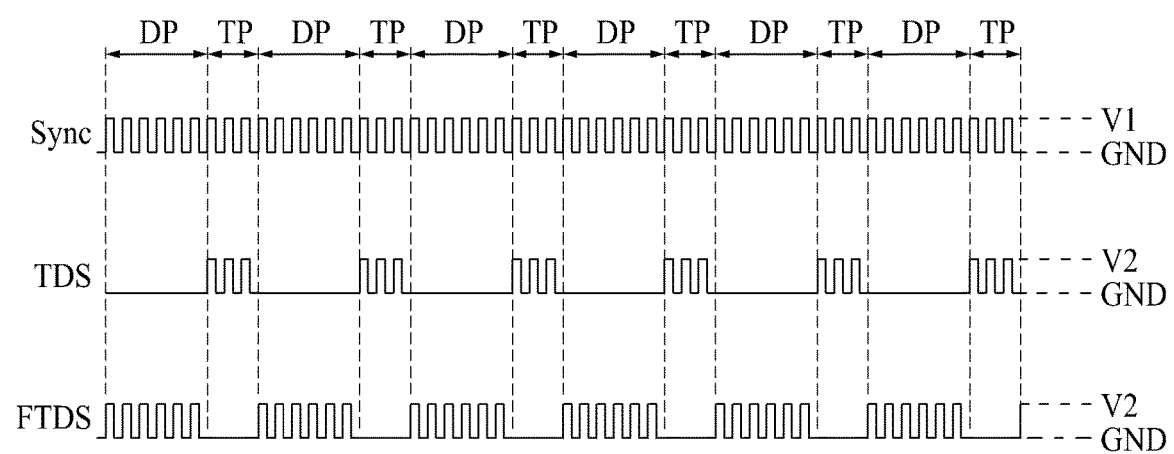
FIG. 8 is a waveform diagram illustrating a sync signal, a touch driving signal, and a force touch driving signal when a touch is sensed in the touch display device according to one embodiment of the present disclosure.

FIG. 8 is a waveform diagram illustrating the sync signal (Sync), the touch driving signal (TDS), and the force touch driving signal (FTDS) when the touch is sensed according to one embodiment of the present disclosure.

A display period (DP) and a touch sensing period (TP) are repeated in the touch display device according to one embodiment of the present disclosure.

For the display period (DP) and the touch sensing period (TP), the sync signal (Sync) is continuously generated. As shown in FIG. 8, the frequency of the sync signal (Sync) supplied for the display period (DP) may be the same as the frequency of the sync signal (Sync) supplied for the touch sensing period (TP), or the frequency of the sync signal (Sync) supplied for the display period (DP) may be different from the frequency of the sync signal (Sync) supplied for the touch sensing period (TP). The sync signal (Sync) may be one signal, or may be a signal obtained by mixing a timing signal used for the display period (DP) with a timing signal used for the touch sensing period (TP). The sync signal (Sync) is generated inside the driving circuit 900, and is supplied to the touch driver 930 and a force touch driver 990.

The touch driving signal (TDS) is generated in the touch driver 930. The touch driving signal (TDS) is supplied to the plurality of touch electrodes (TE) for the touch sensing period (TP). The touch driving signal (TDS) is generated in such a way that the frequency of the touch driving signal (TDS) is identical to the frequency of the sync signal (Sync) supplied for the touch sensing period (TP).

The force touch driving signal (FTDS) is generated in the force touch driver 990. The force touch driving signal (FTDS) is supplied to the display module 100 for the display period (DP). The force touch driving signal (FTDS) is generated in such a way that the frequency of the force touch driving signal (FTDS) is identical to the frequency of the sync signal (Sync) supplied for the display period (DP).

If the touch driving signal (TDS) and the force touch driving signal (FTDS) are input at the same point of time, it is difficult to execute a normal sensing work due to a signal collision. In case of the related art, the touch sensing period (TP) is divided in a time-division method, and the touch driving signal (TDS) and the force touch driving signal (FTDS) are supplied by the time-division method.

According to one embodiment of the present disclosure, the force touch driving signal (FTDS) is supplied for the display period (DP). There is no collision between the force touch driving signal (FTDS) and the data voltage (Vdata) or digital video data supplied for the display period (DP). Accordingly, the force touch driving signal (FTDS) is continuously supplied for the display period (DP) so that it is possible to execute the force touch sensing work.

Figure 9:
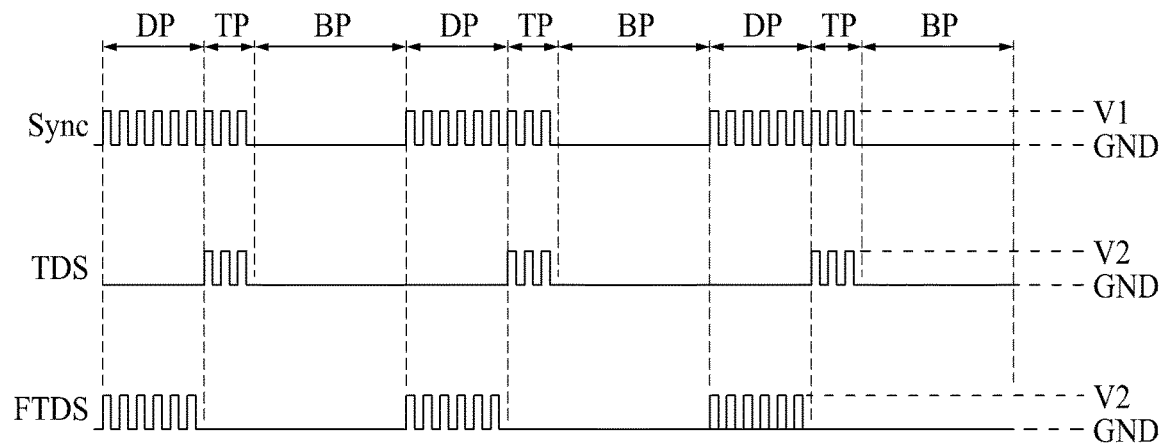
FIG. 9 is a waveform diagram illustrating a sync signal, a touch driving signal, and a force touch driving signal when a touch is not sensed in the touch display device according to one embodiment of the present disclosure.

FIG. 9 is a waveform diagram illustrating the sync signal (Sync), the touch driving signal (TDS), and the force touch driving signal (FTDS) when the touch is not sensed according to one embodiment of the present disclosure.

If the force touch driving signal (FTDS) is continuously supplied even under the circumstances that there is no touch, a power consumption is increased. According to one embodiment of the present disclosure, if the touch is not sensed in the plurality of touch electrodes (TE), it is needed to decrease the oscillation number between the first logic level (V1) and the ground voltage (GND) in the pulse waveform of the sync signal (Sync).

The sync signal (Sync) is generated for the display period (DP) and the touch sensing period (TP). The sync signal (Sync) is not generated in a blank period (BP). As shown in FIG. 9, the frequency of the sync signal (Sync) supplied for the display period (DP) may be the same as the frequency of the sync signal (Sync) supplied for the touch sensing period (TP), or the frequency of the sync signal (Sync) supplied for the display period (DP) may be different from the frequency of the sync signal (Sync) supplied for the touch sensing period (TP). The sync signal (Sync) may be one signal, or may be a signal obtained by mixing a timing signal used for the display period (DP) with a timing signal used for the touch sensing period (TP). The sync signal (Sync) is generated inside the driving circuit 900, and is supplied to the touch driver 930 and the force touch driver 990.

The touch driving signal (TDS) is generated in the touch driver 930. The touch driving signal (TDS) is supplied to the plurality of touch electrodes (TE) for the touch sensing period (TP). The touch driving signal (TDS) may be generated in such a way that the frequency of the touch driving signal (TDS) may be the same as the frequency of the sync signal (Sync) supplied for the touch sensing period (TP).

The force touch driving signal (FTDS) is generated in the force touch driver 990. The force touch driving signal (FTDS) is supplied to the display module 100 for the display period (DP). The force touch driving signal (FTDS) is generated in such a way that the frequency of the force touch driving signal (FTDS) is the same as the frequency of the sync signal (Sync) supplied for the display period (DP).

For the touch sensing period (TP), it is sensed whether or not there is the touch. According to one embodiment of the present disclosure, if there is no touch for the predetermined touch sensing period (TP), the blank period (BP) having a predetermined time period is inserted after the touch sensing period (TP) without no touch. For example, a length of the blank period (BP) may be a total length obtained by adding one display period (DP) and one touch sensing period (TP).

For the blank period (BP), the sync signal (Sync) is maintained as the ground voltage (GND). For the blank period (BP), only the display signal for a display function is inputted. For the blank period (BP), the touch driving signal (TDS) and the force touch driving signal (FTDS) are maintained as the ground voltage (GND). That is, it is impossible to sense the touch for the blank period (B). The voltage levels of the touch driving signal (TDS) and the force touch driving signal (FTDS) are not changed for the blank period (BP), whereby there is no power consumption for generating the touch driving signal (TDS) and the force touch driving signal (FTDS).

According to one embodiment of the present disclosure, if there is no touch for the touch sensing period (TP), the blank period (BP) for which the touch signal is not generated is inserted after the touch sensing period (TP). According to one embodiment of the present disclosure, it is possible to reduce power consumption for generating the touch driving signal (TDS) and the force touch driving signal (FTDS).

The display module 100 according to one embodiment of the present disclosure may include the lower substrate 111 having the gate lines (GL), the data lines (DL), and the plurality of touch electrodes (TE) used as the common electrode for the display mode, the upper substrate 113 bonded to the lower substrate 111, the liquid crystal layer interposed between the lower substrate 111 and the upper substrate 113, and a transparent conductive layer prepared on a rear surface of the lower substrate 111. The transparent conductive layer according to one embodiment of the present disclosure is electrically floating.

Although not explicitly shown in the drawings, the transparent conductive layer may be prepared between a lower polarizing member 115 and the lower substrate 111 of the display panel 110. The transparent conductive layer is prepared on the entire rear surface of the lower substrate 111 facing the housing plate 510. The transparent conductive layer is electrically floating, whereby the transparent conductive layer together with the touch electrode (TE) serves as the touch electrode for sensing the force touch. As the distance between the touch electrode (TE) and the housing plate 510 is more reduced by the transparent conductive layer, the relatively-large capacitance (Cm) is formed between the touch electrode (TE) and the housing plate 510. Accordingly, if the same touch pressure is applied, the distance between the touch electrode (TE) and the housing plate 510 is more reduced by the transparent conductive layer so that the charge amount of the capacitance (Cm) is more increased. As a result, it is possible to improve efficiency of sensing the touch force level in accordance with the touch pressure, thereby improving the force touch sensitivity.

As the transparent conductive layer disposed between the touch electrode (TE) and the housing plate 510 is electrically floating, a fringe field formed around the touch electrode (TE) in accordance with the touch by a user's finger or conductive object is offset so that it is possible to improve efficiency of sensing the change of the capacitance (Cm) between the touch electrode (TE) and the housing plate 510. Also, the transparent conductive layer functions as a noise shielding layer for preventing static electricity or noise generated in the driving circuit 990 received in the housing 500 from getting inside the display panel 110.

The driving circuit 900 according to one embodiment of the present disclosure may include the touch driver 930 which supplies the touch driving signal (TDS) to the plurality of touch electrodes (TE) for the touch sensing period (TP), senses the change of capacitance between the housing plate 510 and the plurality of touch electrodes (TP), and generates the touch raw data based on the change of capacitance, the force touch driver 990 which supplies the force touch driving signal (FTDS) to the transparent conductive layer for the display period (DP), senses the change of capacitance between the housing plate 510 and the transparent conductive layer, and generates the force touch raw data based on the change of capacitance, and the host controller 910 which calculates the touch position based on the touch raw data, and calculates the touch force level based on the force touch raw data.

If the touch raw data and the force touch raw data are generated by the use of individual elements, it is possible to calculate the more-precise touch raw data and force touch raw data. If the touch position calculation and the force touch level calculation are carried out by the independently-generated touch raw data and force touch raw data, there is no collision between the touch position calculation and the force touch level calculation.

According to one embodiment of the present disclosure, the common voltage is supplied to the touch electrode (TE) for the display panel (DP), and the transparent conductive layer is electrically floating for the touch sensing period (TP). Accordingly, the touch electrode (TE) may be used as the common electrode for the display period (DP). Also, the transparent conductive layer does not carry out the force touch for the touch sensing period (TP) so that there is no time collision between the touch sensing work of the touch electrode (TE) for the touch sensing period (TP) and the force touch sensing work of the transparent conductive layer for the touch sensing period (TP).

According to one embodiment of the present disclosure, if a touch is not sensed in the plurality of touch electrodes (TE) on the basis of the touch raw data, the oscillation number between the first logic level (V1) and the ground voltage (GND) in the pulse waveform of the sync signal (Sync) is reduced so that it is possible to reduce the number of changing the pulse waveform of the sync signal (Sync) according as whether or not there is touch in the touch electrode (TE). As a result, if there is no touch in the pulse waveform of the touch driving signal (TDS) and the force touch driving signal (FTDS), the number of changing the pulse waveform of the sync signal (Sync) is reduced so that it is possible to reduce power consumption caused by the touch driving signal (TDS) and the force touch driving signal (FTDS).

Figure 10:
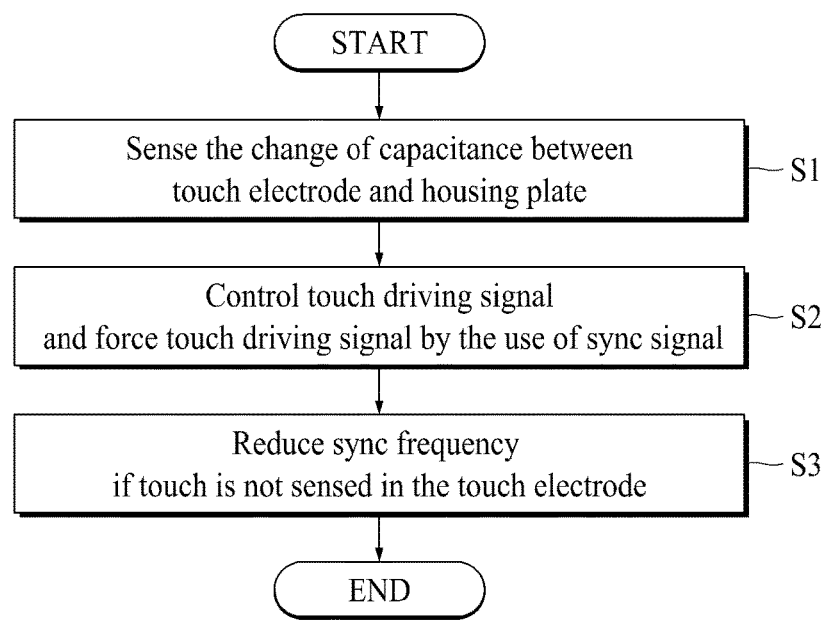
FIG. 10 is a flow chart illustrating a method for driving the touch display device according to one embodiment of the present disclosure.

FIG. 10 is a flow chart of illustrating a method for driving the touch display device according to one embodiment of the present disclosure. The method for driving the touch display device according to one embodiment of the present disclosure may include the following steps.

First, the change of capacitance between the plurality of touch electrodes (TE) and the housing plate 510 in accordance with the change of distance between the plurality of touch electrodes (TE) and the housing plate 510 is sensed in the driving circuit 900. This work is carried out for the touch sensing period (TP) ('S1' of FIG. 10).

Secondly, the number of changing the pulse waveform of the sync signal (Sync) between the high logic level and the low logic level, wherein the sync signal (Sync) is provided to control the force touch driving signal (FTDS) and the touch driving signal (TDS) supplied to the plurality of touch electrodes (TE), is changed by the driving circuit 900. The pulse waveform of the sync signal (Sync) is the same as the pulse waveform of the touch driving signal (TDS) and the force touch driving signal (FTDS). Accordingly, it is possible to control the waveform of the touch driving signal (TDS) and the force touch driving signal (FTDS) by controlling the waveform of the sync signal (Sync) ('S2' of FIG. 10).

Thirdly, if the touch is not sensed in the plurality of touch electrodes (TE), the oscillation number between the first logic level (V1) and the ground voltage (GND) in the pulse waveform of the sync signal (Sync) is reduced by the driving circuit 900. If the pulse waveform of the sync signal (Sync) has the first logic level (V1), the touch driving signal (TDS) and the force touch driving signal (FTDS) have the second logic level (V2). If the pulse waveform of the sync signal (Sync) has the ground voltage (GND), the touch driving signal (TDS) and the force touch driving signal (FTDS) have the ground voltage (GND). Accordingly, if the oscillation number of the sync signal (Sync) is reduced, the oscillation number of the touch driving signal (TDS) and the force touch driving signal (FTDS) is also reduced so that it is possible to reduce power consumption needed for supplying the touch driving signal (TDS) and the force touch driving signal (FTDS) ('S3' of FIG. 10).

The method for driving the touch display device according to one embodiment of the present disclosure may further include supplying the touch driving signal (TDS) to the plurality of touch electrodes (TE) for the touch sensing period (TP) by the touch driver 930, sensing the change of capacitance between the housing plate 510 and the plurality of touch electrodes (TE), and generating the touch raw data based on the change of capacitance. The step of generating the touch raw data is carried out for the touch sensing period (TP).

The method for driving the touch display device according to one embodiment of the present disclosure may further include supplying the force touch driving signal (FTDS) to the transparent conductive layer for the display period (DP) by the force touch driver 990, sensing the change of capacitance between the housing plate 510 and the transparent conductive layer, and generating the force touch raw data based on the change of capacitance. The step of generating the force touch raw data is carried out for the display period (DP).

If the touch raw data and the force touch raw data are generated separately, it is possible to realize a relatively-small error in comparison to a case of generating any one of the touch raw data and the force touch raw data by the use of the other of the touch raw data and the force touch raw data. Also, the touch raw data is generated for the touch sensing period (TP), and the force touch raw data is generated for the display period (DP) so that it is possible to prevent the collision between the process of generating the touch raw data and the process of generating the force touch raw data.

The method for driving the touch display device according to one embodiment of the present disclosure may further include calculating the touch position based on the touch raw data, and calculating the touch force level based on the force touch raw data. The touch position calculation and the touch force level calculation may be carried out in the host controller 910.

In this case, the common voltage is supplied to the touch electrode (TE) for the display period (DP), and the transparent conductive layer is electrically floating for the touch sensing period (TP). Accordingly, the touch electrode (TE) serves as the common electrode for the display period (DP). Also, the transparent conductive layer does not sense the force touch for the touch sensing period (TP) so that there is no collision between the touch sensing work of the touch electrode (TE) for the touch sensing period (TP) and the force touch sensing work of the transparent conductive layer for the touch sensing period (TP).

In the touch display device according to one embodiment of the present disclosure and its driving method, the touch driving signal for the touch sensing and the force touch driving signal for the force touch sensing are supplied in the time-division method. At the same time, it is possible to change the number of changing the pulse waveform of the sync signal (Sync) between the high logic level and the low logic level in the touch display device according to one embodiment of the present disclosure and its driving method. Especially, if there is no touch, the change number of the sync signal is reduced so that it is possible to reduce the power consumption caused by the touch driving signal and the force touch driving signal.

It will be apparent to those skilled in the art that various modifications and variations can be made to embodiments of the present disclosure without departing from the spirit or scope of the disclosure. Thus, it is intended that the present disclosure covers the modifications and variations of this disclosure provided they come within the scope of the appended claims and their equivalents.

What is claimed is:

1. A touch display device, comprising:
    a display module having a plurality of touch electrodes;
    a cover window for covering a front surface of the display module;
    a housing having a housing plate and a housing sidewall, wherein the housing plate with electrical conductivity is arranged below a rear surface of the display module, and the housing sidewall surrounds at least one portion of a lateral surface of the display module or supports the display module; and
    a driving circuit for sensing a change of capacitance between the plurality of touch electrodes and the housing plate in accordance with a distance change between the plurality of touch electrodes and the housing plate, wherein the driving circuit changes the number of changing a pulse waveform of a sync signal between a high logic level and a low logic level, wherein the sync signal is provided to control a touch driving signal supplied to the plurality of touch electrodes, and a force touch driving signal supplied to the display module,
    wherein the display module includes:
    a lower substrate having gate and data lines, and the plurality of touch electrodes used as a common electrode for a display mode;
    an upper substrate bonded to the lower substrate;
    a liquid crystal layer between the lower substrate and the upper substrate; and
    a transparent conductive layer prepared on a rear surface of the lower substrate,
    wherein the transparent conductive layer is electrically floating, and
    wherein the driving circuit includes:
    a touch driver for supplying the touch driving signal to the plurality of touch electrodes for the touch sensing period, sensing the change of capacitance between the plurality of touch electrodes and the housing plate, and generating touch raw data;
    a force touch driver for supplying the force touch driving signal to the transparent conductive layer for a display period, sensing the change of capacitance between the transparent conductive layer and the housing plate, and generating force touch raw data; and
    a host controller for calculating a touch position based on the touch raw data, and a touch force level based on the force touch raw data.

2. The touch display device according to claim 1, wherein, if there is no touch for a predetermined touch sensing period the driving circuit inserts a blank period having a predetermined time length after the predetermined touch sensing period.

3. The touch display device according to claim 1, wherein a common voltage is supplied to the touch electrode for the display period, and the transparent conductive layer is electrically floating for the touch sensing period.

4. The touch display device according to claim 1, wherein the host controller reduces the oscillation number between a first logic level and a ground voltage in the pulse waveform of the sync signal if a touch is not sensed in the plurality of touch electrodes.

5. A method for driving a touch display device, comprising:
    sensing the change of capacitance between a plurality of touch electrodes and a housing plate in accordance with the change of distance between the plurality of touch electrodes and the housing plate by the use of driving circuit;
    changing the number of changing a pulse waveform of a sync signal between a high logic level and a low logic level, wherein the sync signal is provided to control a touch driving signal supplied to the plurality of touch electrodes, and a force touch driving signal, by the use of driving circuit,
    supplying the touch driving signal to the plurality of touch electrodes for a touch sensing period, sensing the change of capacitance between the plurality of touch electrodes and the housing plate, and generating touch raw data in a touch driver;
    supplying the force touch driving signal to a transparent conductive layer for a display period, sensing the change of capacitance between the transparent conductive layer and the housing plate, and generating force touch raw data in a force touch driver; and
    calculating a touch position based on the touch raw data, and a touch force level based on the force touch raw data in a host controller.

6. The method according to claim 5, further comprising reducing the oscillation number between a first logic level and a ground voltage in the pulse waveform of the sync signal by the use of driving circuit if a touch is not sensed in the plurality of touch electrodes.

7. The method according to claim 5, wherein a common voltage is supplied to the touch electrode for the display period, and the transparent conductive layer is electrically floating for the touch sensing period.

\* \* \* \* \*